May 19, 1925.

A. B. HERRICK 1,538,187

METHOD AND APPARATUS FOR PLACING WINDINGS IN MOTOR STATORS

Filed March 27, 1923      3 Sheets-Sheet 1

INVENTOR
Albert B. Herrick,
By Bates & Macklin,
ATTORNEYS

May 19, 1925.
A. B. HERRICK
METHOD AND APPARATUS FOR PLACING WINDINGS IN MOTOR STATORS
Filed March 27, 1923     3 Sheets-Sheet 2
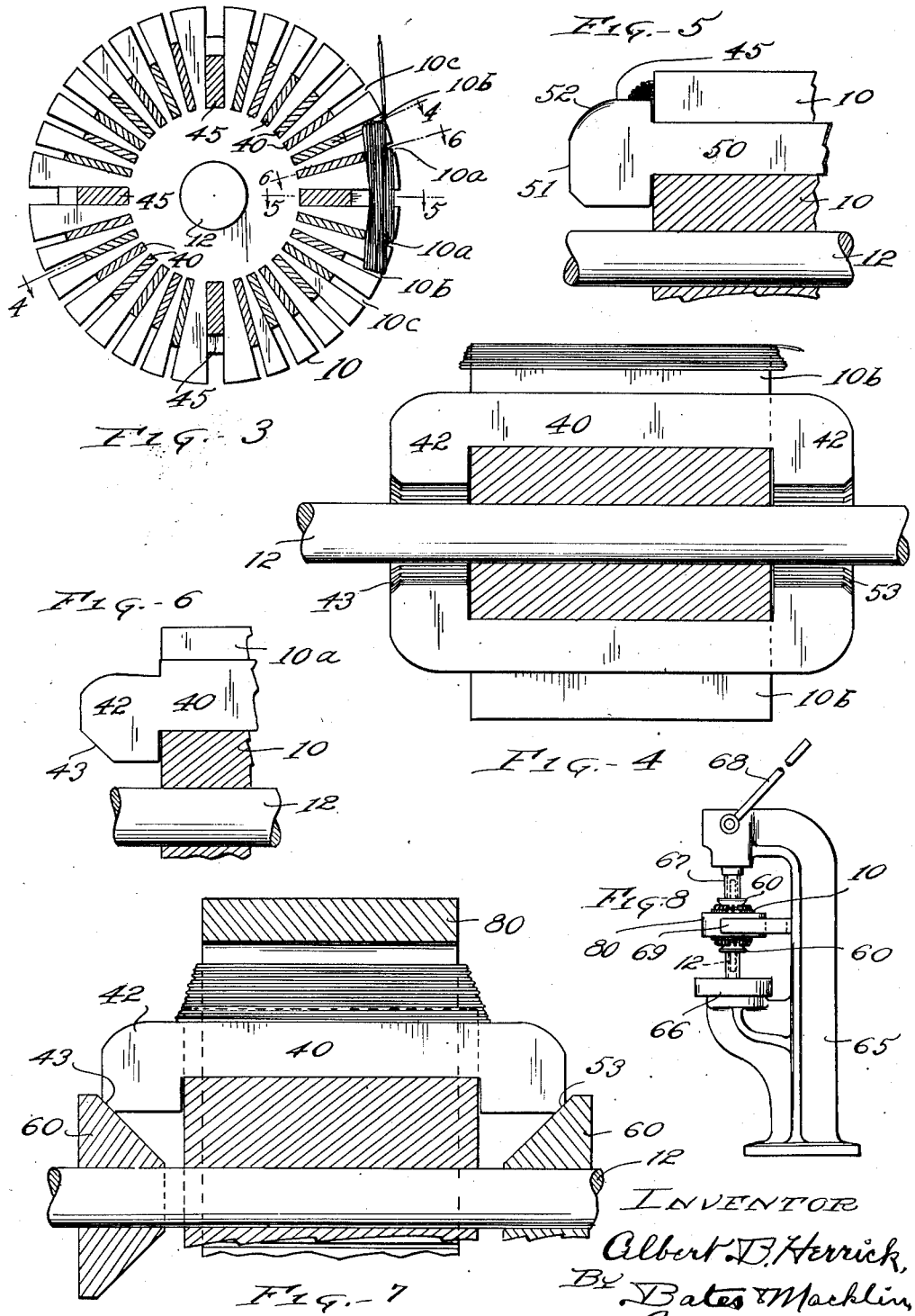

May 19, 1925. 1,538,187
A. B. HERRICK
METHOD AND APPARATUS FOR PLACING WINDINGS IN MOTOR STATORS
Filed March 27, 1923 3 Sheets-Sheet 3
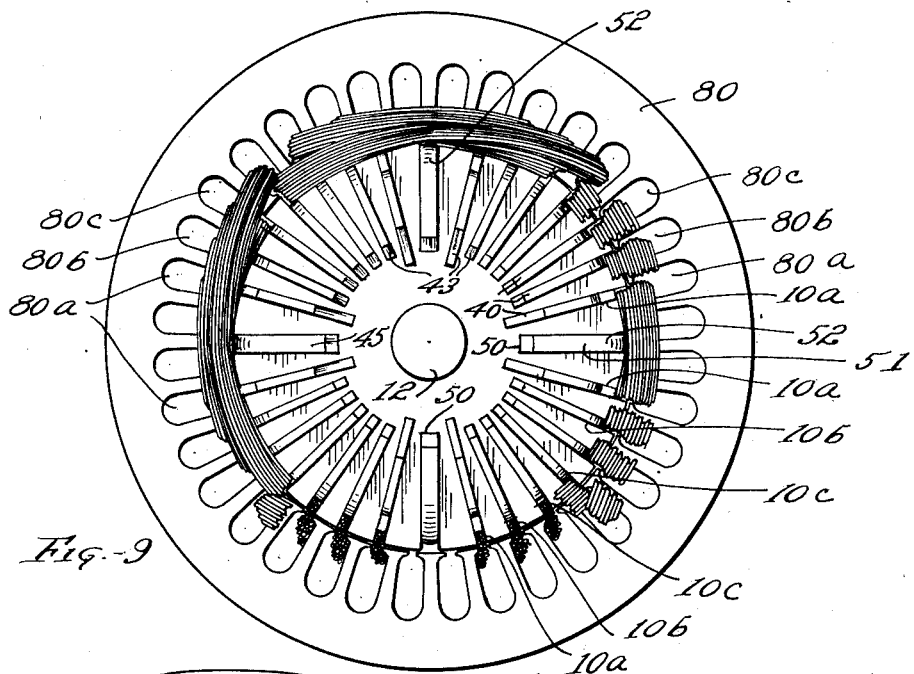
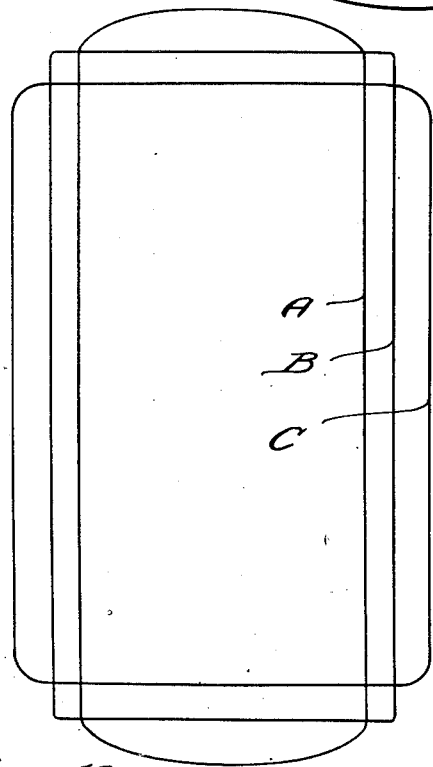
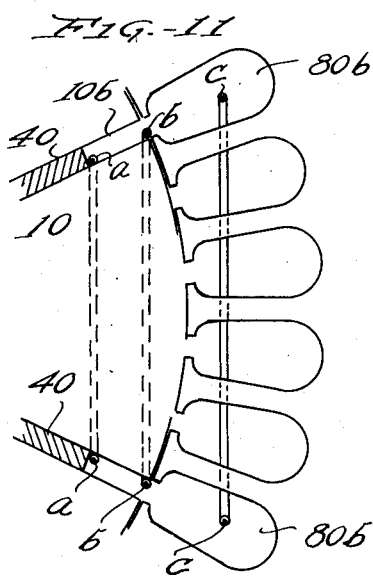
INVENTOR
Albert B. Herrick,
By Bates & Macklin
ATTORNEYS

Patented May 19, 1925.

1,538,187

UNITED STATES PATENT OFFICE.

ALBERT B. HERRICK, OF CLEVELAND, OHIO, ASSIGNOR TO THE DOMESTIC ELECTRIC COMPANY, OF CLEVELAND, OHIO, A CORPORATION OF OHIO.

METHOD AND APPARATUS FOR PLACING WINDINGS IN MOTOR STATORS.

Application filed March 27, 1923. Serial No. 628,162.

*To all whom it may concern:*

Be it known that I, ALBERT B. HERRICK, a citizen of the United States, residing at Cleveland, in the county of Cuyahoga and State of Ohio, have invented a certain new and useful Improvement in Methods and Apparatus for Placing Windings in Motor Stators, of which the following is a full, clear, and exact description, reference being had to the accompanying drawings.

This invention is concerned with a method and apparatus for forming and positioning coils of wire in predetermined turns and effectively transferring them from an efficient winding device to the inwardly opening slots of motor stators. The general object of the invention is to accomplish the rapid and efficient formation of field coils for electric motor stators or the like to place them into the slotted field frames with certainty, facility and accuracy and without damaging the wire coils or the insulation.

More specifically, an object of the invention is to use the highly efficient method of winding coils upon outwardly facing slots of a form, corresponding to a slotted armature, and thereafter by simple steps and means expand all those coils simultaneously into a slotted field frame, transferring the coils from the mandrel or form to their respective slots in the field frame. In carrying out such a transferring step, the difficulty immediately presented and heretofore regarded practically insurmountable, was that of attempting to expand the coils wound on a form and of small diameter to the field frame of larger diameter. A specific object of the invention, therefore, includes an arrangement of the winding form suitable for permitting and causing this radial expansion of the coils in the outward direction necessary to permit them to be so transferred.

The steps and apparatus by which I accomplish this invention are illustrated in the accompanying drawings and more fully described in the following specification which refers thereto, the essential characteristics being summarized in the claims.

Figure 1:
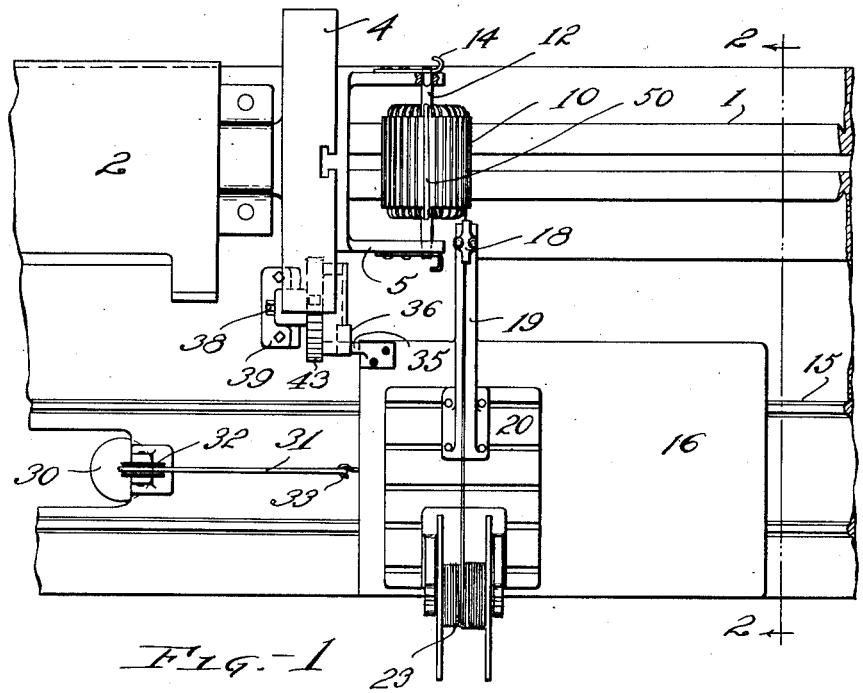
Figure 2:
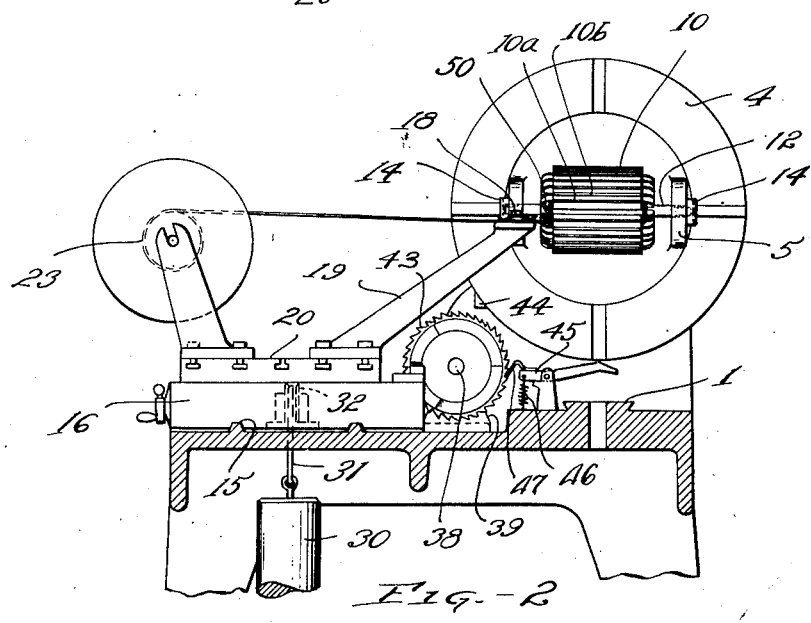

In the drawings, Fig. 1 is a plan view of a suitable winding apparatus, carrying the winding form for making coils and from which form they are transferred to the stator; Fig. 2 is a sectional end elevation of the same, being taken substantially on the plane indicated by line 2—2 of Fig. 1; Fig. 3 is a transverse section through the winding form showing the coils in the process of being wound thereon; Fig. 4 is a longitudinal section through the winding form; Fig. 5 is an enlarged sectional detail, showing one of the transverse pushers or blades; Fig. 6 is a similar view of another one of the pushers or blades; Fig. 7 is a longitudinal section, showing method of moving these blades outwardly, moving the coils outwardly to the field frame, being a somewhat diagrammatic view, showing one blade and a portion of the field frame; Fig. 8 is an illustration of the suitable press for operating cams to thrust these pusher blades outwardly; Fig. 9 is an end elevation, more or less diagrammatic, of the form in a stator frame showing the coils partly moved outwardly; Fig. 10 is a diagrammatic view showing the relative position of a coil on the form, and in an intermediate position, and in final position on the stator frame; Fig. 11 is a diagrammatic view showing the progress of one turn of wire, illustrating this outward movement from the form to the field frame.

It has heretofore been customary and practical to wind the coils of armatures upon the armature and in the slots thereof by a winding device which rotates the armature endwise, that is, rotating it upon an axis transverse to the normal axis of the armature. In such case, the given number of turns are put into opposite or nearly opposite slots; then the armature is turned upon its own axis and new slots are presented to the wire which is led thereto through a suitable guide and from a spool or the like. Such an arrangement of mechanism, in general principle, is illustrated in Fig. 1, where, for example, I take a lathe construction having a bed 1 and a head 2, in which is mounted a suitable spindle, carrying the face plate, or chuck, as shown at 4. In this instance the face plate carries a suitable bracket adapted to embrace the shaft 12 of a winding form 10, to be presently described. It may be mounted for rotation and for turning upon the axis of the shaft 12, by the arms of the brackets 5 in which it may be removably secured by suitable spring latches, such for example as are illustrated at 14.

At the side of the bed plate or frame of the lathe, or like winding device, is shown a guideway 15, on which is mounted a carriage 16, supporting a wire guide bracket having a guiding eye 18, on a bracket arm 19, rising from a suitable support at 20. From this same support, carried on the carriage 16, is also mounted a support for a revolving spool which may be removably secured and which may carry a roll of wire as indicated at 23.

It will be seen that by rotating the plate 4 and bracket 5, with the form 10, in the path of the wire led from the guideway 18, that the wire may be caused to lie in the slots of this form and the given number of coils may be put into any pair of slots to provide for the grouping of the coils as is necessary, and in accordance with any desired manner of selection.

I have shown a means for automatically causing the shifting of the carriage 16 from one pair of coils to another, after the first number of turns is wound into any one pair of coils by moving the carriage and guideway toward the shaft 12 of the form 10. In winding of field coils, it is frequently desirable to wind for one pole a certain group of coils, for instance two adjacent slots include one coil; the two slots at either side thereof include another; and those outside of that, still another. By a series of steps from an outermost position such as indicated in Fig. 1, I may wind coils first into the outer or adjacent slots and then into the next pair, and then into the next, such a stepping operation taking place automatically after a given number of turns of the form.

A preferred method of accomplishing this shifting of the guideway to wind successive sets of coils may consist of a means for moving the carriage 16, tending normally to exert a pull on the same while causing a cam stopping the carriage in a certain position to shift after a given number of turns of the form. In Figs. 1 and 2, I have shown weight 30, on a flexible member 31, guided over a pulley 32, and attached as at 33, the carriage 16 tending normally to draw the carriage to the left in Fig. 1, that is, toward the form on the spindle. The stop indicated at 35 bears against the face of a stepped cam 36, mounted on a suitable shaft 38, in a bracket 39, carried by the frame of the lathe. Rigid with this cam is a group or series of dog teeth 43 which are adapted to be engaged by a spring pawl 47 carried on a lever 45 which is acted upon by a projection 44 on the rotating member 4. This pawl carrying the form serves to prevent reverse rotation of the step cam 36 in one direction and to move it in an opposite direction. The lever member is shown as pivoted to a support on the lathe bed and acting by reason of a spring member 46 to turn the ratchet always in one direction irrespective of the direction in which the lathe head is rotated. The teeth on the periphery of the cam are arranged so that upon a given number of turns with consequent engagement of the projection 44, the surface of one of the cams, which by the way, is a rest surface, permits the projection or stop 35 to slide off from that surface on the next one, bringing the guideway 18 into alignment with the next pair of slots.

After laying the coils by this winding action, step by step into a series of three pairs of slots on the form, the form may be given a definite quarter, third or half turn, as the case may be, and a new set of coils may be wound into the slots thus presented.

While I have described the winding mechanism for placing the coils in the form which will be presently described, it is within the spirit of my invention to use any suitable winding means or even to place these coils upon such a mandrel by hand. With the winding of the coils in the slots, the turns of wire necessary are put, for example, into the pair of slots which I now designate 10$^a$, after which a shift of the winding guide will bring the winding wire into alignment with the next outside of these to a pair of slots now designated 10$^b$, and a third shift will bring the wire to wind it into the pair of slots designated 10$^c$. In Fig. 3, the 10$^a$ and 10$^b$ slots have the wires therein, the 10$^b$ slot not yet being finished. Having thus placed the wires in the slots, it is necessary to move them outwardly into the slots of the stator.

I propose to accomplish this by a series of movable pusher blades designated 40 in the various slots, the pairs of which have been designated 10$^a$, 10$^b$ and 10$^c$. In Fig. 3 and Fig. 9, is illustrated four pairs each of the slots 10$^a$, 10$^b$ and 10$^c$, and intermediate these pairs of slots, the coils of which become the pole coils of a stator, are movable cams or pusher blades designated 45 for engaging the ends of the coils only.

The principle of this winding and transferring which makes the present invention practicable is that the body of the form 10 is longer than the body of the slotted field frame 80, (see Fig. 7), into which these coils are to be placed. The coils are preferably wound upon the form with their ends curved substantially as they will be curved when they are placed in the corresponding slots in the stator. It is also desirable to arrange the pusher blades or movable cams so that when they are caused to simultaneously expand, the wires will first become taut as they move outwardly toward the radiating slots of the stator, and as they slide off from the form the portions of the wire along the sides of the coil or turn, that is, the parts of the wire running through the slots, becoming shortened while those wire parts of each turn which extend transversely of the slots, become correspondingly lengthened. This latter lengthening permits a coil of a shape to fit the form to move outwardly from the form to the stator. This will be illustrated more fully presently.

The form itself consists of the body member 10, as described, having a series of slots extending into it as shown substantially somewhat more than one half of its radius, the sides of these slots being parallel, but the slots generally being truly radial, that is, the center of each slot is radial with relation to the axis of the form. There are, as described, four groups of slots. Another method of grouping may be seen by the inspection of Fig. 3, where are shown six slots spaced apart so that they correspond precisely to the spacing of the slots of the stator for which the form is to be used. The coils wound on the form illustrated consist of four groups of three coils each, each group occupying the $10^a$, $10^b$ and $10^c$ coils of two of the groups which are separated by certain equal spaces, as illustrated in Fig. 3. Thicker and somewhat differently shaped pushers 45 are used between these groups and are adapted to engage only the end portions, that is, the transverse parts of the turns of the coils. These pushers 45 are illustrated particularly in Fig. 5, where we have shown a member extending through the slots longitudinally and having a shoulder at each end thereof, there being a shank designated 50, and a head portion 51, with a curved surface 52, the shoulders embracing the ends of the form in such manner as to position these while the outer faces of the head engage the coils as illustrated in Figs. 3 and 5. At either side of this in the slot $10^a$ are somewhat wider pushers than the others which allow for fewer coils in the slots $10^a$, in case part of the stator slots into which these coils are to be pushed are to be used for starting coils. A somewhat longer bevel 43 is provided on the heads of these pushers to allow their outward faces to reach the periphery of the form at the same time with the narrower pushers in slots $10^b$ and $10^c$. The pushers 40 have heads with curved surfaces as shown, and the inner edges of each of the heads at both ends are bevelled as illustrated at 43 and 53 respectively, and are adapted to be engaged at these points by conical cams 60. These cams embrace the shaft 12 and are adapted when urged together to move all of the blades and pushers outwardly simultaneously to make the shifts of the coils from the form to the field frame 60.

As a convenient means for causing the windings on the form to move outwardly into the stator slots, by moving the conical cam members 60 together, a press such as illustrated in Fig. 8 may be used. Such types of presses are commonly called arbor presses and have a frame 65 carrying platen 66, and a movable press or thrust spindle 67 operated by a lever such as shown at 68. A suitable holder may be provided, as indicated at 69, to embrace the field frame and the shaft 12 would extend upwardly into the thrust sleeves or collars, as shown, wherefor a direct thrust is brought to bear upon the outer surface of the cam blocks 60, and thus all of the pusher plates are moved outwardly radially of the form, bringing the windings into the slots of the stator.

The progress of these windings from the form to the stator slots is illustrated in Fig. 9 where the movement of the pushers is shown as partly finished. The windings of the slots $10^a$, $10^b$ and $10^c$ may be moved into the corresponding slots $80^a$, $80^b$ and $80^c$, as stated. When the first outward movement of the pushers occurs, the turns of the coils are tightened and the end portions are slightly elongated to permit them to pass out of the diverging slots, and further movement of pushers thrust them well into the slots of the stator.

As shown in Fig. 10, where A indicates approximately the shape of the turn when first wound, B indicates the shape and position thereof, just as it is passing out of the slots of the form and C the approximate final form on the stator. These corresponding portions are illustrated in Fig. 11, where we assume first a turn of wire "$a$" to be in the slots $10^b$. It will be noted that the looseness of this coil is taken up and its width is increased as it is moved to the position "$b$," where it is just passing out of the form slots, at which point the length of the coil may be further decreased by reason of the fact that the field frame is materially shorter than the winding form, as appears clearly from Fig. 7. Thus this same turn may take the position "$c$," assuming that there are other wires in the same slots $80^b$. The pushers 45 give the ends the usual outward curve, whereby the bundle of wires of the group of coils may clear the armature.

From the foregoing description, it will be seen that I have provided a unique winding form on which a predetermined number of turns of wire may be wound with great facility, by the turning of the form as described, and that the form may be thereafter thrust into a field frame and by the simple expediency of the next step, namely that of causing all of these coils to move outwardly of the slots until they are wound, permitting them to shorten and expand circumferentially as the radial distance is increased, until each turn is in position in the stator slots. I am enabled to make this transfer without injury to the wire in any way, whereby the coils of wire may be more effectively and efficiently placed in position in the stator slots than by any method heretofore known.

While I have shown and described a method consisting of a series of simple steps and an apparatus for carrying out those steps, whereby windings may be placed on the form from the outside thereof, and be later transferred to inwardly faced slots of the motor stator frame. The principle of my invention may be useful for other purposes in the forming and transferring of coils of various kinds not used for motors. While the illustrated embodiment of the present invention is particularly useful for motors, it is not intended that the scope of the invention shall be thereby limited but that such embodiment shall be considered as an illustration.

Having thus described my invention, I claim:—

1. A method of placing windings in inwardly faced slots of motor field frames or the like, including the steps of forming the windings into coils of a predetermined number of turns and upon a form from the outside thereof, the winding coils being longer and narrower than the slots which are to be occupied but having approximately the given lineal distance in each turn as though originally placed in the slots to be occupied and thereafter causing such windings to register with those slots, and moving them outwardly radially into the slots of the field frame or the like, all such movements simultaneously causing the turns to change shape and conform to their eventual positions.

2. A method for forming and placing windings in inwardly facing slots of a motor frame which includes the steps of forming such windings in a predetermined number of turns on a form by winding from the outside into a series of outwardly faced slots, causing such slots to register with the inwardly facing slots and simultaneously moving the coils outwardly into the inwardly facing slots, permitting them to widen and shorten during the outward radial movement.

3. The steps in a process of forming field windings for inwardly facing slots of motor stators consisting of winding a predetermined number of turns of a plurality of coils into outwardly facing radial slots, and thereafter causing said coils to move outwardly radially of said slots into registering slots of the field frame, permitting the lateral extension of the coils by longitudinal shortening thereof during such radial movement.

4. In a method of forming and placing coils in inwardly faced slots of a motor field frame, the steps of winding a series of coils of predetermined turns into outwardly facing slots, adapted to be registered with the slots of the field frame, causing means in the slots to thrust the coils therein outwardly simultaneously, after registering the slots of the form with the slots of the stator, and also causing the end portions of the coils when in the stator slots to curve outwardly to clear the armature.

5. In a method for forming and placing windings in inwardly facing slots of a motor frame, the steps of forming such windings in a predetermined number of turns on a form placing the form in the motor frame and expanding the coils while permitting them to widen and shorten during the expanding movement.

6. An apparatus for forming and placing coils in a stator, including essentially a form having a series of outwardly projecting slots, adapted to register with the slots of the stator, and having stripper blades fitting slidably in each of the slots throughout their length, and means for moving said stripper blades to thrust the windings outwardly radially, said form being longer with relation to its axis than the frame into which the coils are to be placed.

7. A winding form adaptable for the formation of a series of coils and having expansible means for transferring the coils to field frame slots of a motor, means for holding and guiding a supply of wire to the form, means for revolving the form and means for shifting the guiding means automatically upon a predetermined number of turns in any one set of coils to present the wire to the form for subsequent turns in a second set of coils.

8. An apparatus for forming and transferring windings to the slots of a motor stator, consisting of a substantially cylindrical form, having a length somewhat greater than the stator frame, a plurality of slots in the form adapted to register with certain slots of the stator frame when the form is placed therein and slidable coil stripper bars in the slots extending through the length thereof and projecting past the ends of the form and having shoulders for causing the end portions of the windings to lie substantially arcuate, and means for engaging all of said stripper bars simultaneously and moving them outwardly radially of the form to push the windings outwardly into the stator frame slots.

9. An apparatus for forming and placing coils in a stator, including essentially a form having a series of outwardly projecting slots, adapted to register with the slots of the stator, and radially expanding means associated with the slots and adapted to act on coils formed therein to thrust the coil outwardly.

10. A winding form onto which a series of coils may be placed and which may be thereafter transferred to field frame slots of a motor, means for holding and guiding a supply of wire to the slots, means for revolving the form and means for shifting the guiding means upon a predetermined number of turns in any one pair of slots to present the wire for subsequent turns to another pair of slots, said means including a stepped cam, and means acting consequent upon rotation of the form holding means to move said cam from one step to another, a stop member rigid with the guide and acting against said cam, and means normally urging the guide holding means toward the cam.

11. The method of forming the field windings of a motor stator of the slotted type which consists of winding a plurality of said coils upon a coil forming mandrel by rotating the mandrel about an axis which bisects the plane of each coil turn, placing the mandrel in a stator frame with the longitudinal coil stretches thereof in alignment with the slots of the stator frame and exerting pressure on the respective coils to cause longitudinal stretches thereof to increase in length while decreasing the transverse stretches of the coil turns and thereby transferring the coils from the mandrel to the slots of the stator frame.

12. The method of forming field coils of a slotted stator and positioning the coils in the slots thereof, which consists of forming a plurality of such coils upon a slotted cylindrical mandrel by rotating the mandrel about an axis normal to its axis a predetermined number of times to form a set of coils, causing relative movement between the mandrel and a wire guiding means whereby a second set of coils may be formed in slots adjacent to the slots carrying the first set of formed coils, repeating this winding operation to consummate the formation of four sets of coils comprising a field quadrant, indexing the mandrel substantially 90° to repeat the formation of a second group of coil sets comprising a second quadrant and repeating this indexing of the mandrel to effect the formation of four quadrants of coils, removing the mandrel with the coils thereon from the winding machine, positioning the mandrel in the slotted stator with the longitudinal stretches of the respective sets of coils in alignment with the slots thereof and expanding the coils to cause them to be stripped from said mandrel and to be transferred to the slots of the stator.

In testimony whereof, I hereunto affix my signature.

ALBERT B. HERRICK.